United States Patent
Cheung et al.

(10) Patent No.: US 9,738,541 B2
(45) Date of Patent: Aug. 22, 2017

(54) SYNTHESIS OF CERIUM OXIDE NANORODS

(71) Applicant: NUtech Ventures, Lincoln, NE (US)

(72) Inventors: Chin Li Cheung, Lincoln, NE (US); Zane Charles Gernhart, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 137 days.

(21) Appl. No.: 14/515,493

(22) Filed: Oct. 15, 2014

(65) Prior Publication Data

US 2016/0107896 A1    Apr. 21, 2016

(51) Int. Cl.
*C01F 17/00* (2006.01)
*B01J 37/34* (2006.01)

(52) U.S. Cl.
CPC ........ *C01F 17/0043* (2013.01); *B01J 37/346* (2013.01); *C01P 2004/04* (2013.01); *C01P 2004/16* (2013.01); *C01P 2004/54* (2013.01); *C01P 2004/61* (2013.01); *C01P 2004/64* (2013.01); *C01P 2006/12* (2013.01)

(58) Field of Classification Search
CPC .. C01F 17/0043; B01J 19/0013; B01J 19/126; B01J 2219/0871; B01J 2219/1275; B01J 2219/00072; B01J 2219/00141; C01P 2004/04; C01P 2004/61; C01P 2006/12; C01P 2004/64; C01P 2004/54; C01P 2004/16

See application file for complete search history.

(56) References Cited

U.S. PATENT DOCUMENTS

| | | | |
|---|---|---|---|
| 4,908,108 | A | 3/1990 | Horbez et al. |
| 7,504,356 | B1 | 3/2009 | Self et al. |
| 2003/0166987 | A1 | 9/2003 | Roark |
| 2013/0123100 | A1 | 5/2013 | Cheung et al. |

OTHER PUBLICATIONS

Ji, Zhaoxia, et al. "Designed synthesis of CeO2 nanorods and nanowires for studying toxicological effects of high aspect ratio nanomaterials." ACS nano 6.6 (2012): 5366-5380.*

Li, Yuanzhi, et al. "Coupling oxygen ion conduction to photocatalysis in mesoporous nanorod-like ceria significantly improves photocatalytic efficiency." The Journal of Physical Chemistry C 115.29 (2011): 14050-14057.*

(Continued)

*Primary Examiner* — Richard M Rump
(74) *Attorney, Agent, or Firm* — Fish & Richardson P.C.

(57) ABSTRACT

Cerium oxide nanorods having a variety of aspect ratios can be produced by providing a first mixture that includes a cerium precursor material, and using microwave to heat the first mixture to a first temperature for a period of time to produce first plurality of cerium oxide nanorods having a first range of aspect ratios. A second mixture that includes a cerium precursor material heated using microwave to a second temperature for a period of time to produce second plurality of cerium oxide nanorods having a second range of aspect ratios. The first plurality of cerium oxide nanorods and the second plurality of cerium oxide nanorods are mixed to produce third plurality of cerium oxide nanorods having the third range of aspect ratios that is broader than the first range or the second range.

43 Claims, 10 Drawing Sheets

(56) References Cited

OTHER PUBLICATIONS

Gao, Feng, Qingyi Lu, and Sridhar Komarneni. "Fast synthesis of cerium oxide nanoparticles and nanorods." Journal of nanoscience and nanotechnology 6.12 (2006): 3812-3819.*

Sun, Chunwen, et al. "Controlled synthesis of CeO2 nanorods by a solvothermal method." Nanotechnology 16.9 (2005): 1454.*

Mai, Hao-Xin, et al. "Shape-selective synthesis and oxygen storage behavior of ceria nanopolyhedra, nanorods, and nanocubes." The Journal of Physical Chemistry B 109.51 (2005): 24380-24385.*

Abad et al., "Catalyst Parameters Determining Activity and Selectivity of Supported Gold Nanoparticles for the Aerobic Oxidation of Alcohols: The Molecular Reaction Mechanism," *Chemistry: A European Journal*, 2007, 14(1):212-222.

Araujo et al., "CeO2 nanoparticles synthesized by a microwave-assisted hydrothermal method: evolution from nanospheres to nanorods," *CrystEngComm*, 2012, 14(3):1150-1154.

Babu et al., "Dopant-mediated oxygen vacancy tuning in ceria nanoparticles," *Nanotech.*, 2009, 20(8): 085713, 5 pages.

Baghbanzadeh et al., "Microwave-Assisted Synthesis of Colloidal Inorganic Nanocrystals," *Angew. Chem. Int. Ed.*, 2011, 50:11312-11359.

Bartholomew and Farrauto, *Fundamentals of industrial catalytic processes*, Wiley-Interscience: New Jersey, 2011, chapter 9, 635-704.

Bilecka et al., "Microwave chemistry for inorganic nanomaterials synthesis," *Nanoscale*, Aug. 2010;2(8):1358-1374.

Boudart, "Turnover Rates in Heterogeneous Catalysis," *Chem. Rev.*, 1995, 95(3):661-666.

Campbell et al., "Chemistry—Oxygen vacancies and catalysis on ceria surfaces," *Science*, 2005, 309(5735):713-714.

Chen et al., "Formation of $CeO_2$ Nanotubes from $Ce(OH)CO_3$ Nanorods through Kirkendall Diffusion," *Inorg. Chem.*, 2009, 48(4):1334-1338.

Chen et al., "Template-free Synthesis of Single-Crystalline-like $CeO_2$ Hollow Nanocubes," *Crystal Growth & Design*, 2008, 8(12):4449-4453.

Chueh et al., "High electrochemical activity of the oxide phase in model ceria—Pt and ceria—Ni composite anodes," *Nat. Mater.*, 2011, 11(2):155-161. DOI: 10.1038/nmat3184.

Deus et al., "Influence of mineralizer agents on the growth of crystalline CeO2 nanospheres by the microwave-hydrothermal method," *J. Alloy Compd.*, 2013, 550(0), 245-251.

Du et al., "Ligand-free Self-Assembly of Ceria Nanocrystals into Nanorods by Oriented Attachment at Low Temperature," *J. Phys. Chem. C*, 2007, 111(34):12677-12680.

Erdemir et al., "Nucleation of Crystals from Solution: Classical and Two-Step Models," *Acc. Chem. Res.*, 2009, 42(5):621-629. DOI: 10.1021/ar800217x.

Esch et al., "Electron localization determines defect formation on ceria substrates," *Science*, 2005, 309(5735):752-755.

Gao et al., "Fast Synthesis of Cerium Oxide Nanoparticles and Nanorods," *J. Nanosci. Nanotechnol.*, 2006, 6(12):3812-3819.

Godinho et al., "Influence of Microwave Heating on the Growth of Gadolinium-Doped Cerium Oxide Nanorods," *Cryst. Growth Des.*, 2008, 8(2):384-386.

Gonzalez-Rovira et al., "Single-Step Process to Prepare $CeO_2$ Nanotubes with Improved Catalytic Activity," *Nano Lett.*, 2009, 9(4):1395-1400.

Grabow et al., "Lattice strain effects on CO oxidation on Pt(111)," *Phys. Chem. Chem. Phys.*, 2006, (29):3369-3374.

Greeley et al., "Strain-Induced Formation of Subsurface Species in Transition Metals," *Angew. Chem. Int. Ed.*, 2004, 43(33):4296-4300.

Han et al., "Formation and Oxidation State of CeO2-x Nanotubes," *J. Am. Chem. Soc.*, 2005, 127:12514-12815.

Han et al., "One-Dimensional Ceria as Catalyst for the Low-Temperature Water-Gas Shift Reaction," *J. Phys. Chem. C*, 2009, 113(2): 21949-21955.

Holgado et al., "Study of $CeO_2$ XPS spectra by factor analysis: reduction of $CeO_2$," *Appl. Surf. Science*, 2000, 161(3-4):301-315.

Ji et al., "Designed Synthesis of CeO2 Nanorods and Nanowires for Studying Toxicological Effects of High Aspect Ratio Nanomaterials," *ACS Nano*, 2012, 6(6):5366-5380. DOI: 10.1021/nn3012114. Epub Jun. 7, 2012.

Jiang et al., "Theoretical study of environmental dependence of oxygen vacancy formation in CeO2," *Appl. Phys. Letters*, 2005, 87:141917, 3 pages.

Kuiry et al., "Spontaneous Self-Assembly of Cerium Oxide Nanoparticles to Nanorods through Supraaggregate Formation," *J. Phys. Chem. B*, 2005, 109(15):6936-6939.

Larese et al., "Deactivation of real three way catalysts by CePO4 formation," *Appl. Catal. B*, 2003, 40(4):305-317.

Larese et al., "Effects of calcination temperature on the stability of CePO4 detected in vehicle-aged commercial three-way catalysts," *Appl. Catal. B*, 2004, 48(2):113-123.

Lawrence et al., "Defect Engineering in Cubic Cerium Oxide Nanostructures for Catalytic Oxidation," *Nano Lett.*, 2011, 11(7):2666-2671. DOI: 10.1021/nl200722z. Epub May 31, 2011.

Li et al., "Direction-Specific Interactions Control Crystal Growth by Oriented Attachment," *Science*, 2012, 336(6084):1014-1018. DOI: 10.1126/science.1219643.

Lin et al., "Synthesis, Characterization, and the Application of 1-D Cerium Oxide Nanomaterials: A Review," *Int. J. Mol. Science*, 2010, 11(9):3226-3251. DOI: 10.3390/ijms11093226.

Liu et al., "Facile hydrothermal synthesis of CeO2 nanosheets with high reactive exposure surface," *J. Alloy Compd.*, 2011, 509(23):6720-6724.

Luo et al., "High-surface area $CuO-CeO_2$ catalysts prepared by a surfactant-templated method for low-temperature CO oxidation," *J. Catal.*, 2007, 246(1):52-59.

Mavrikakis et al., "Effect of Strain on the Reactivity of Metal Surfaces," *Phys. Rev. Lett.*, 1998, 81(13):2819-2822.

Nilius, "Properties of oxide thin films and their adsorption behavior studied by scanning tunneling microscopy and conductance spectroscopy," *Surf. Science Rep.*, 2009, 64(12):595-659.

Nolan et al., "Oxygen vacancy formation and migration in ceria," *Solid State Ionics*, 2006, 177(35-36):3069-3074.

Pan et al., "Template-Free Synthesis, Controlled Conversion, and CO Oxidation Properties of $CeO_2$ Nanorods, Nanotubes, Nanowires, and Nanocubes," *Eur. J. Inorg. Chem.*, 2008, (15):2429-2436.

Pirmohamed et al., "Nanoceria exhibit redox state-dependent catalase mimetic activity," *Chem Commun.*, 2010, 46(16):2736-2738.

Rao et al., "Mesoporous CeO2 nanobelts synthesized by a facile hydrothermal route via controlling cationic type and concentration of alkali," *Microporous Mesoporous Mater.*, 2013, 169(0)81-87.

Serrano-Ruiz et al., "Pt-Sn catalysts supported on highly-dispersed ceria on carbon: Application to citral hydrogenation," *J. Mol. Catalysis A: Chemical*, 2007, 268(1-2):227-234.

Shan et al., "The Synthesis of Three-Dimensional $CeO_2$ and Their Catalytic Activities for CO Oxidation," *Catal. Lett.*, 2009, 131(3):350-355.

Singh et al., "A phosphate-dependent shift in redox state of cerium oxide nanoparticles and its effects on catalytic properties," *Biomaterials*. 2011, 32(28):6745-6753. DOI:10.016/j.biomaterials. 2011.05.073. Epub Jun. 24, 2011.

Sun and Chen, "Controllable Synthesis of Shuttle-Shaped Ceria and Its Catalytic Properties for CO Oxidation," *Eur. J. Inorg. Chem.*, 2009, 26:3883-3887.

Tang et al., "The role of Sn in Pt-Sn/Ce02 catalysts for the complete oxidation of ethanol," *J. Mol. Catalysis A: Chemical*, 2005, 235(1-2):122-129.

Trovarelli, *Catalysis by Ceria & Related Materials (Catalytic Science Series*, vol. 2). Imperial College Press: London, 2002, chapters 1-3, 83 pages.

Wang et al., "The preparation of Au/Ce02 catalysts and their activities for low-temperature CO oxidation," *Catal Lett.*, 2006, 112(1-2):115-119.

(56) References Cited

OTHER PUBLICATIONS

Widmann et al., "Activation of a Au/CeO2 catalyst for the CO oxidation reaction by surface oxygen removal/oxygen vacancy formation," *J. Catal.*, 2007, 251:437-442.

Yan et al., "Template-Free Hydrothermal Synthesis of CeO2 Nano-octahedrons and Nanorods: Investigation of the Morphology Evolution," *Cryst. Growth Des.*, 2008, 8(5):1474-1477.

Yu et al., "Controlled Synthesis of CeO2 Flower-Like and Well-Aligned Nanorod Hierarchical Architectures by a Phosphate-Assisted Hydrothermal Route," *J. Phys. Chem. C*, 2008, 112(50)19896-19900.

Yu et al., "Large-Scale Nonhydrolytic Sol—Gel Synthesis of Uniform-Sized Ceria Nanocrystals with Spherical, Wire, and Tadpole Shapes," *Angew. Chem. Int. Ed. Eng.*, 2005, 44(45):7411-7414.

Zhang et al., "Fabrication of novel threefold shape $CeO_2$ dendrites: Optical and electrochemical properties," *Chem. Phys. Lett.*, 2006, 430(4-6)326-329.

Zhang et al., "Oxygen vacancy clusters on ceria: Decisive role of cerium f electrons," *Phys. Rev. B*, 2009, 79(7): 075433, 11 pages.

Zhang et al., "Phases in Ceria—Zirconia Binary Oxide (1-x)CeO2—xZrO2 Nanoparticles: The Effect of Particle Size," *J. Am. Ceram. Soc.*, 2006, 89:1028-1036.

Zhong et al., "3D Flowerlike Ceria Micro/Nanocomposite Structure and Its Application for Water Treatment and CO Removal," *Chem. Mater.*, 2007, 19(7):1648-1655.

Zhou et al., "Influence of nanostructured ceria support on platinum nanoparticles for methanol electrooxidation in alkaline media," *RSC Adv.*, 2013, 4(3):1270-1275.

Zhou et al., "Highly Reducible $CeO_2$ Nanotubes," *Chem Mater.*, 2007, 19(6):1215-1217.

Zhou, "Metal-oxide interfaces at the nanoscale," *Appl Phys Lett.*, 2009, 94(233115):1-3.

International Search Report and Written Opinion in International Application PCT/US2011/031467, dated Jan. 2, 2012, 12 pages.

International Preliminary Report on Patentability in International Application PCT/US2011/031467, dated Oct. 18, 2012, 8 pages.

Bevan et al., "Mixed oxides of the type MO2 (fluorite)-M2O3-I: Oxygen Dissociation Pressures and Phase Relationships in the System CeO2—Ce2O3 at High Temperatures," Journal of Inorganic and Nuclear Chemistry 26(9), Sep. 1964.

Skoda et al., "Sn interaction with the CeO2(1 1 1) system: Bimetallic bonding and ceria reduction," Applied Surface Science 254(14), pp. 4375-4379, May 2008.

Tana et al., "Morphology-dependent redox and catalytic properties of CeO2 nanostructures: Nanowires, nanorods and nanoparticles," Catalysis Today 148(1-2), pp. 179-183, Mar. 2009.

Karpenko et al., "Influence of the catalyst surface area on the activity and stability of Au/CeO2 catalysts for the low-temperature water gas shift reaction," Topics in Catalysis 44(1-2), pp. 183-198, Jun. 2007.

\* cited by examiner

SYNTHESIS OF CERIUM OXIDE NANORODS

STATEMENT REGARDING FEDERALLY SPONSORED RESEARCH OR DEVELOPMENT

This invention was made with government support under W911NF-10-2-0099 awarded by the Army Research Laboratory. The government has certain rights in the invention.

CROSS-REFERENCE TO RELATED APPLICATIONS

This application is related to U.S. application Ser. No. 13/639,778, filed on Jan. 29, 2013, which is the U.S. national stage application of PCT application PCT/US2011/031467, filed on Apr. 6, 2011. The above application is incorporated herein by reference in its entirety.

TECHNICAL FIELD

This subject matter is generally related to synthesis of cerium oxide nanorods.

BACKGROUND

Catalysts can be used to change the rates and control the yields of chemical reactions to increase the amounts of desirable products from these reactions and reduce the amounts of undesirable ones. For example, fluorite-structured cerium oxide ($CeO_{2-x}$, $0 \leq x < 0.5$, also referred to as ceria) can be used in catalytic converters for reducing carbon monoxide emissions in exhaust gases from motor vehicles. Cerium oxide is also an important industrial catalyst used in petroleum refining, fuel cells, water gas shift reaction, and organic chemical synthesis. A variety of cerium oxide nanostructures, including nanoparticles, nanotubes, nanodendrites, and nanorods can be synthesized. Cerium oxide nanorods have high effective surface-to-volume ratios because they have a low tendency of forming high density aggregates (as compared to nanoparticles) and their propensity to expose high energy crystalline facets for improved catalytic performance.

SUMMARY

In general, in one aspect, a method of fabricating cerium oxide nanorods having a variety of aspect ratios is provided. The method includes providing a first mixture that includes a cerium precursor material; using microwave to heat the first mixture to a first temperature for a first period of time and producing first plurality of cerium oxide nanorods having a first range of aspect ratios; providing a second mixture that includes a cerium precursor material; using microwave to heat the second mixture to a second temperature different from the first temperature for a second period of time and producing second plurality of cerium oxide nanorods having a second range of aspect ratios; and mixing the first plurality of cerium oxide nanorods and the second plurality of cerium oxide nanorods to produce third plurality of cerium oxide nanorods having the third range of aspect ratios that is broader than the first range or the second range.

In general, in another aspect, a method of fabricating cerium oxide nanorods having a variety of lengths is provided. The method includes providing a first mixture that includes a cerium precursor material; using microwave to heat the first mixture to a first temperature and producing first plurality of cerium oxide nanorods having a first range of lengths; providing a second mixture that includes a cerium precursor material; using microwave to heat the second mixture to a second temperature different from the first temperature and producing second plurality of cerium oxide nanorods having a second range of lengths; and mixing the first plurality of cerium oxide nanorods and the second plurality of cerium oxide nanorods to produce third plurality of cerium oxide nanorods having the third range of lengths that is broader than the first range or the second range.

In general, in another aspect, a method of fabricating cerium oxide nanorods is provided. The method includes receiving input specifying an aspect ratio or a length; accessing information that maps aspect ratios and lengths to temperatures, and based on the information, mapping the input aspect ratio or length to a specified temperature; using microwave to heat a mixture that includes a cerium precursor material to the specified temperature and produce a plurality of cerium oxide nanorods having aspect ratios or lengths that correspond to the input aspect ratio or length.

In general, in another aspect, an apparatus for fabricating cerium oxide nanorods is provided. The apparatus includes an input device for receiving a user input specifying an aspect ratio or a length; a container configured to store a mixture that includes a cerium precursor material; a storage device storing information that maps aspect ratios and lengths to temperatures, a microwave heater; and a controller that is configured to map a user specified aspect ratio or length to a temperature based on the mapping information, and control the microwave heater to heat the mixture in the container to the specified temperature and produce a plurality of cerium oxide nanorods having aspect ratios or lengths that correspond to the input aspect ratio or length.

Implementations of the various aspects may include one or more of the following features. The first mixture can include a cerium sulfate precursor and sodium hydroxide. The second mixture can include a cerium sulfate precursor and sodium hydroxide. The ratio of the cerium sulfate precursor to the sodium hydroxide can be the same for the first and second mixtures. The cerium oxide nanorods can include fluorite structured cerium oxide nanorods. The first mixture can be heated to a first temperature in a range from 80° C. to 200° C. The first and second temperatures can have a difference that is at least 10° C., 50° C., or 100° C. The aspect ratios of the cerium oxide nanorods can have a range from 5:1 to 60:1. The first plurality of cerium oxide nanorods can have a first average aspect ratio, the second plurality of cerium oxide nanorods can have a second average aspect ratio, and the first average aspect ratio can be greater than the second average aspect ratio by at least 50%, 200%, or 300%. The lengths of the cerium oxide nanorods can have a range from 40 nm to 2100 nm. The first plurality of cerium oxide nanorods can have a first average length, the second plurality of cerium oxide nanorods can have a second average length, and the first average length can be greater than the second average length by at least 50%, 200%, or 300%. After heating each of the first and second mixtures, the mixture is cooled, filtered, and dried to produce the plurality of cerium oxide nanorods. The storage device can store information about a first aspect ratio that maps to a first temperature, a second aspect ratio that maps to a second temperature, and the first aspect ratio is greater than the second aspect ratio by at least 50%, 200%, or 300%. The storage device can store information about a first length that maps to a first temperature, a second length that maps to a second temperature, and the first length is greater than the second length by at least 50%, 200%, or 300%. The storage device can store information about aspect ratios or lengths of cerium oxide nanorods that correspond to temperatures in a range from 80° C. to 200° C. The storage device can store information about microwave heating temperatures that correspond to aspect ratios of cerium oxide nanorods in a range from 5:1 to 60:1.

DETAILED DESCRIPTION

Figures 1A, 1B, 1C, 1D, 1E, 1F, 1G, 1H, 1I, 1J, 1K:
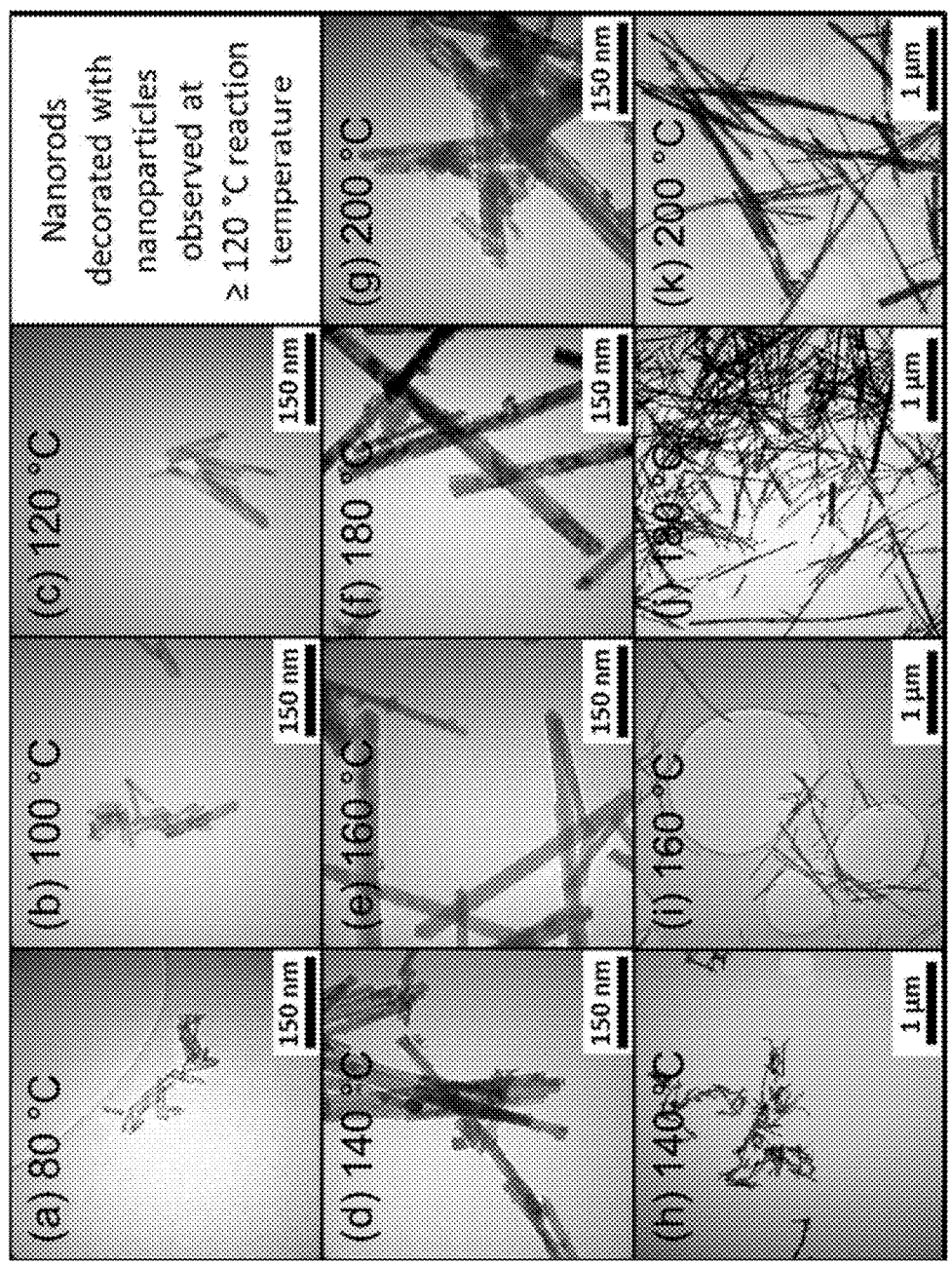
FIGS. 1(a) to 1(k) show TEM images of cerium oxide nanorods.
Figures 2A, 2B, 2C, 2D, 2E, 2F, 2G, 2H:
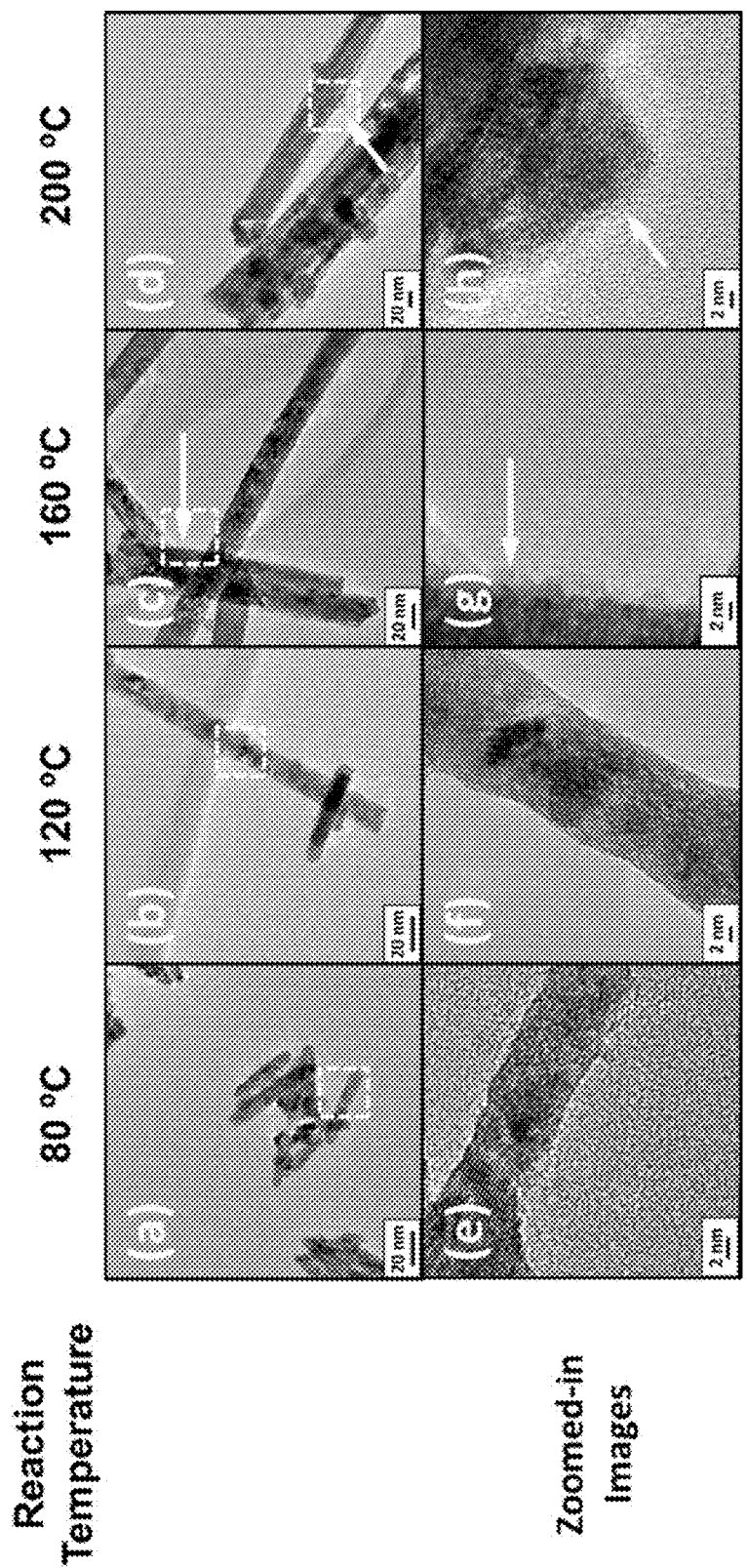
FIGS. 2(a) to 2(h) show TEM images of cerium oxide nanorods.

This document describes a method of synthesizing cerium oxide nanorods with the ability to tune the lengths and/or aspect ratios of the nanorods during production. In some implementations, microwave is used to heat a mixture that includes a cerium precursor material. By modifying the microwave heating so that the reaction is performed at different temperatures, cerium oxide nanorods having different lengths and/or aspect ratios can be produced. For example, the aspect ratios can range from about 6:1 to 40:1, and the lengths of the nanorods can range from less than 51 nm to greater than 1.7 μm by varying the reaction temperature from 80° C. to 200° C. An advantage of this method is that the synthesis time can be shortened, compared to using a convection oven to heat the mixture. Another advantage is that modification of the lengths and/or aspect ratios of the nanorods can be achieved without using additives. This is better than conventional methods of modifying the chemical precursors, such as adding mineralizer agents and surfactants, changing reactants or reactant concentrations, or adding seed crystals, in order to change the size or geometry of cerium oxide nanoparticles. Additions or changes to the chemical makeup of the reaction system may increase the likelihood of chemical contamination and reduce the catalytic ability of the cerium oxide nanoparticles.

In some implementations, cerium oxide nanorods can be produced using the following process. Cerium sulfate hydrate ($Ce_2(SO_4)_3 \cdot xH_2O$) is mixed with sodium hydroxide and placed in a container. For example, the cerium sulfate hydrate can be cerium sulfate octahydrate ($Ce_2(SO_4)_3 \cdot 8H_2O$), and the container can be made of Teflon. The container is placed inside a microwave reaction system, and microwave is used to heat the container to increase the reaction temperature. For example, a MARS 6 microwave reaction system, available from CEM, Matthews, N.C., can be used. The reactants (cerium sulfate hydrate and sodium hydroxide) are stirred to facilitate reactant mixing during the reaction. The microwave reaction system is controlled to heat the mixture to a specified temperature, which can range from, e.g., 80° C. to 200° C. When the specified temperature is reached, the reaction mixture is held at the specified temperature for a specified period of time, e.g., one hour. The reaction products or synthesized products are cooled, filtered, rinsed, and dried. For example, the synthesized products can be cooled to room temperature. The products can be filtered using, e.g., 0.3 μm pore-size polycarbonate membranes. The filtered products can be rinsed with water. The resulting yellow powder can be dried in a convection oven at a temperature above room temperature, e.g., at 50° C., for several hours.

When cerium oxide nanorods of different lengths or aspect ratios are needed, the same ratio of cerium sulfate hydrate to sodium hydroxide can be used and heated to different temperatures. It is not necessary to use organic molecules at any stage of the synthesis process, reducing the risk of contamination and the need for post processing. In some examples, just by varying the microwave heating temperature from 80° C. and 200° C., the size of the as-synthesized $CeO_{2-x}$ nanorods can be controlled from less than 51 nm to greater than 1.7 μm, an increase in length of over 3000%. The resulting changes in aspect ratios varied from about 6:1 to 40:1 and the corresponding surface areas varied from about 22 $m^2/g$ to 117 $m^2/g$. In some implementations, the ratio of cerium sulfate hydrate to sodium hydroxide can also be varied for different reaction temperatures.

In some implementations, a table is established having information that maps aspect ratios and/or lengths to temperatures. The table can be established by, e.g., fabricating cerium oxide nanorods using the process described above and heating the mixture to various temperatures, then measuring the aspect ratios and lengths of the synthesized cerium oxide nanorods. After the table is established, when a user wishes to produce cerium oxide nanorods having particular aspect ratios or lengths, the user can look up the table to identify the temperature that corresponds to the desired aspect ratio or length. Cerium oxide nanorods is then produced using the process above, in which microwave is used to heat the mixture to the identified temperature during the reaction process.

In some implementations, cerium oxide nanorods of various lengths and/or aspect ratios are compressed into pellets or other compressed format. When cerium oxide nanorods having similar lengths and/or aspect ratios are compressed into pellets, many of the nanorods may align and be compacted together, significantly reducing the surface area (compared to the nanorods in powder form). By using cerium oxide nanorods of various lengths and/or aspect ratios, the nanorods will be less aligned, resulting in less compaction and retaining more surface area in the pellet format. When the cerium oxide nanorods are used as catalysts for chemical reactions, using pellets having cerium oxide nanorods with greater surface areas may result in better performance.

In some implementations, an industrial flow process for mass producing cerium oxide nanorods may include producing cerium oxide nanorods having various aspect ratios or lengths in parallel and then mixing them to produce a mixture of cerium oxide nanorods having a wide range of aspect ratios or lengths. For example, a cerium oxide nanorod production system may include a first container that receives a first mixture of cerium sulfate octahydrate and sodium hydroxide, and a first microwave oven that heats the first mixture to a first temperature for a first specified period of time. The synthesized materials are cooled, filtered, rinsed, and dried to produce first cerium oxide nanorods having a first range of aspect ratios and/or lengths.

The cerium oxide nanorod production system may include a second container that receives a second mixture of cerium sulfate octahydrate and sodium hydroxide, and a second microwave oven that heats the second mixture to a second temperature for a second specified period of time. The synthesized materials are cooled, filtered, rinsed, and dried to produce second cerium oxide nanorods having a second range of aspect ratios and/or lengths. The first cerium oxide nanorods are mixed with the second cerium oxide nanorods to produce third cerium oxide nanorods having a third range of aspect ratios and/or lengths that is broader than the first range or the second range.

In some implementations, an industrial flow process for mass producing cerium oxide nanorods may include producing cerium oxide nanorods having various aspect ratios or lengths serially and then mixing the different batches of products to produce a mixture of cerium oxide nanorods having a wide range of aspect ratios and/or lengths. For example, a cerium oxide nanorod production system may include a container that receives a first mixture of cerium sulfate octahydrate and sodium hydroxide, and a microwave oven that heats the first mixture to a first temperature for a first specified period of time. The synthesized materials are cooled, filtered, rinsed, and dried to produce first cerium oxide nanorods having a first range of aspect ratios and/or lengths. The first cerium oxide nanorods are set aside.

The container receives a second mixture of cerium sulfate octahydrate and sodium hydroxide. The microwave oven heats the second mixture to a second temperature for a second specified period of time. The synthesized materials are cooled, filtered, rinsed, and dried to produce second cerium oxide nanorods having a second range of aspect ratios and/or lengths. The first cerium oxide nanorods are mixed with the second cerium oxide nanorods to produce third cerium oxide nanorods having a third range of aspect ratios and/or lengths that is broader than the first range or the second range.

The following describes experiments that have been conducted for synthesizing cerium oxide nanorods. In this example, 5 mL of a 0.1 g/mL solution of cerium (III) sulfate octahydrate ($Ce_2(SO_4)_3 \cdot 8H_2O$, 99.999%, available from Alfa-Aesar, Ward Hill, Mass.) in water was mixed with 40 mL of 10 M sodium hydroxide and placed in an EasyPrep Teflon autoclave vessel (available from CEM, Matthews, N.C.). The sealed vessel was placed inside a MARS 6 microwave reaction system, in which the temperature was monitored using a fiber optic probe. Microwave heating was used to increase the reaction temperature at a ramp rate of approximately 2° C./min. The reactants were stirred by a Teflon stir bar to facilitate reactant mixing during the reaction. Once the desired temperature was reached, the reaction mixture was held at the designated temperature for one hour. The reaction temperatures evaluated were 80° C., 100° C., 120° C., 140° C., 160° C., 180° C., and 200° C. The products were then cooled to room temperature. The as-synthesized material was filtered using 0.3 µm pore-size polycarbonate membranes and rinsed with 300 mL of water. The resulting yellow powder was dried in a convection oven at 50° C. for several hours.

The morphologies and dimensions of the cerium oxide samples were characterized using transmission electron microscopy (TEM) using Hitachi H7500 transmission electron microscope, available from Hitachi High Technologies America, Pleasanton, Calif. For each reaction temperature, the corresponding average aspect ratios and lengths of unbroken cerium oxide nanorods were measured and calculated from fifty nanorods. The unbroken nanorods typically displayed faceted-and-pointed ends. The quality and crystal structure of the prepared materials were assessed using powder X-ray diffractometry (XRD) using Empyrean diffractometer, available from PANalytical, Westborough, Mass. The Cu $K_\alpha$ X-ray source of the diffractometer had an average wavelength of 1.544 Å. Peak assignments for the XRD data were made using ICDD data card #04-013-4361. The nature of the resulting crystals was further analyzed using high-resolution transmission electron microscopy (HRTEM) and select area electron diffraction (SAED) using Tecnai F-20 transmission electron microscope, available from FEI, Hillsboro, Oreg. Brunauer-Emmett-Teller (BET) measurements of the samples' surface areas were performed on an ASAP 2010 physisorption analyzer, available from Micrometrics Instrument Corporation, Norcross, Ga.

The effect of increasing reaction temperature on the size and morphology of the resulting $CeO_{2-x}$ nanorods was revealed by the TEM morphological study. The examined samples were found to demonstrate the nanorod morphology over the range of evaluated reaction temperatures. The length of the nanorods was observed to increase over the temperature range evaluated.

FIGS. 1(a) to 1(g) show TEM images of cerium oxide nanorods, which show increasing length and aspect ratio with increasing synthesis temperature from 80° C. to 200° C. The figures show images of nanorods taken at the same magnification. There is an increasing number of nanoparticles present on the nanorod surface in the center row (FIGS. 1(d) to 1(g)). FIGS. 1(h) to 1(k) show zoomed out images of larger nanorods synthesized from 140° C. to 200° C.

The length of nanorods synthesized at 80° C. was approximately 51 nm with an average width of approximately 8 nm. The nanorods synthesized at 200° C. were on average 1.7 µm in length and 45 nm in diameter. Nanorods synthesized at temperatures between 80° C. and 200° C. showed a trend of increasing size with increasing synthesis temperature. The lengths and widths of unbroken nanorods, which were observed to have faceted-and-pointed ends, were measured from the TEM images and used to calculate the aspect ratios.

Table 1 below shows the aspect ratios, lengths, and surface areas of various samples of cerium oxide nanorods synthesized by the microwave hydrothermal method.

TABLE 1

| Reaction temperature (° C.) | Aspect ratio | Nanorod length (nm) | Surface area (m²/g) |
|---|---|---|---|
| 80 | 6.2 ± 1.2 | 51 ± 10 | 117 |
| 100 | 9.8 ± 1.8 | 95 ± 16 | 110 |
| 120 | 11.8 ± 1.8 | 131 ± 19 | 82 |
| 140 | 14.9 ± 3.0 | 297 ± 75 | 77 |
| 160 | 18.7 ± 3.3 | 444 ± 118 | 48 |
| 180 | 32.3 ± 5.4 | 929 ± 151 | 63 |
| 200 | 38.9 ± 16.5 | 1733 ± 329 | 21 |

FIGS. 2(a) to 2(d) show TEM images of cerium oxide nanorods synthesized at 80° C., 120° C., 160° C., and 200° C., respectively. FIGS. 2(e) to 2(h) show corresponding zoomed-out TEM images of the white boxes in the image directly above (i.e., FIGS. 2(a) to 2(d), respectively). Arrows indicate the locations of ceria nanoparticles. Note that as the reaction temperature increases, the frequency for the presence of ceria nanoparticles on the nanorods and the size of these particles increases correspondingly.

Figure 3:
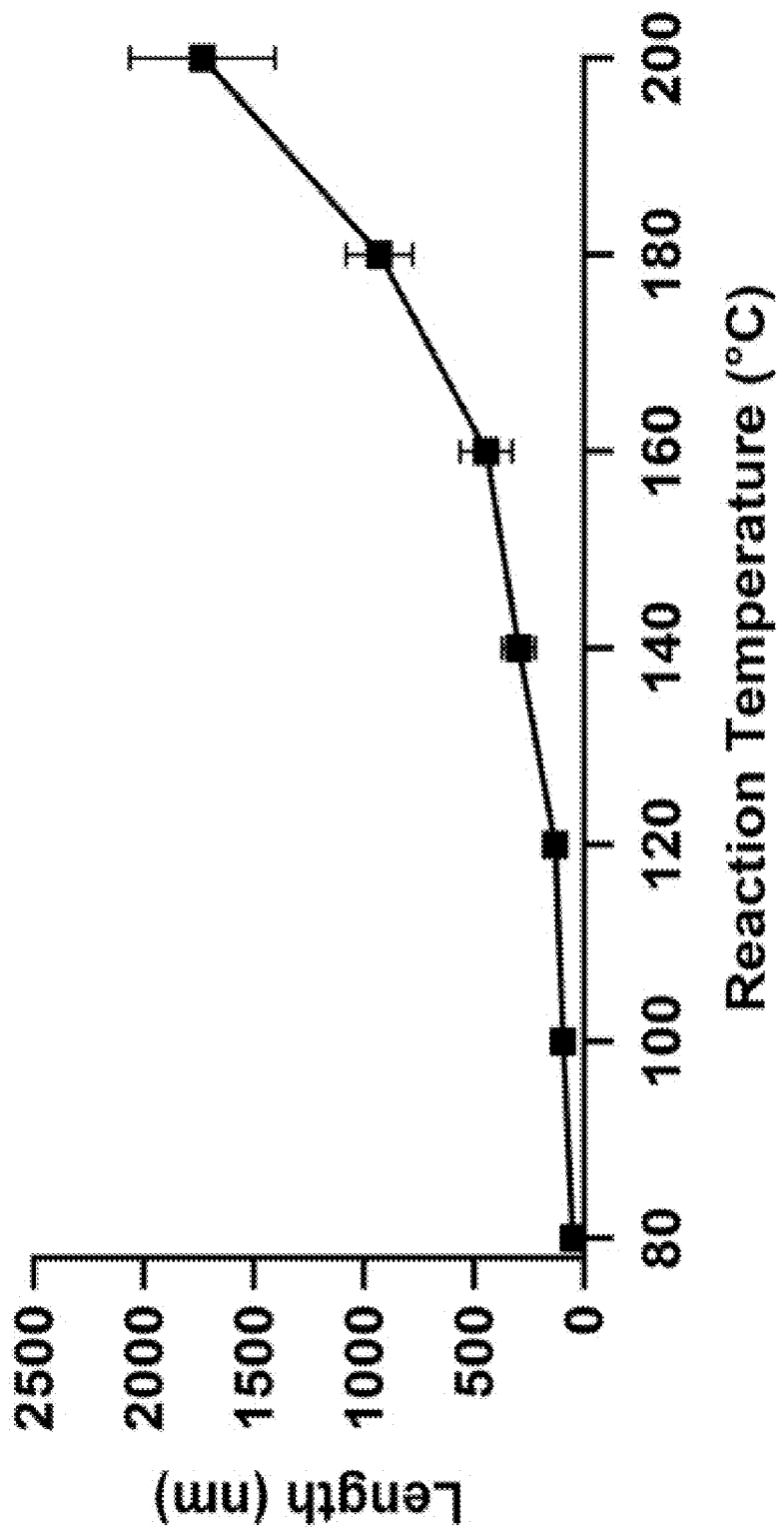
FIG. 3 is a graph showing the length of microwave synthesized cerium oxide nanorods versus their reaction temperatures.

FIG. 3 is a graph showing a relationship between the lengths of microwave synthesized cerium oxide nanorods versus their reaction temperatures. For each reaction temperature, 50 length data points were obtained from measurements using the corresponding TEM images. Error bars indicate ±1 standard error.

The transition from nanoscale to microscale in length had a marked effect on the aspect ratio of the rod material. This ratio was observed to increase from about 6:1 at the reaction temperature of 80° C. to about 40:1 at the reaction temperature of 200° C.

Figure 4:
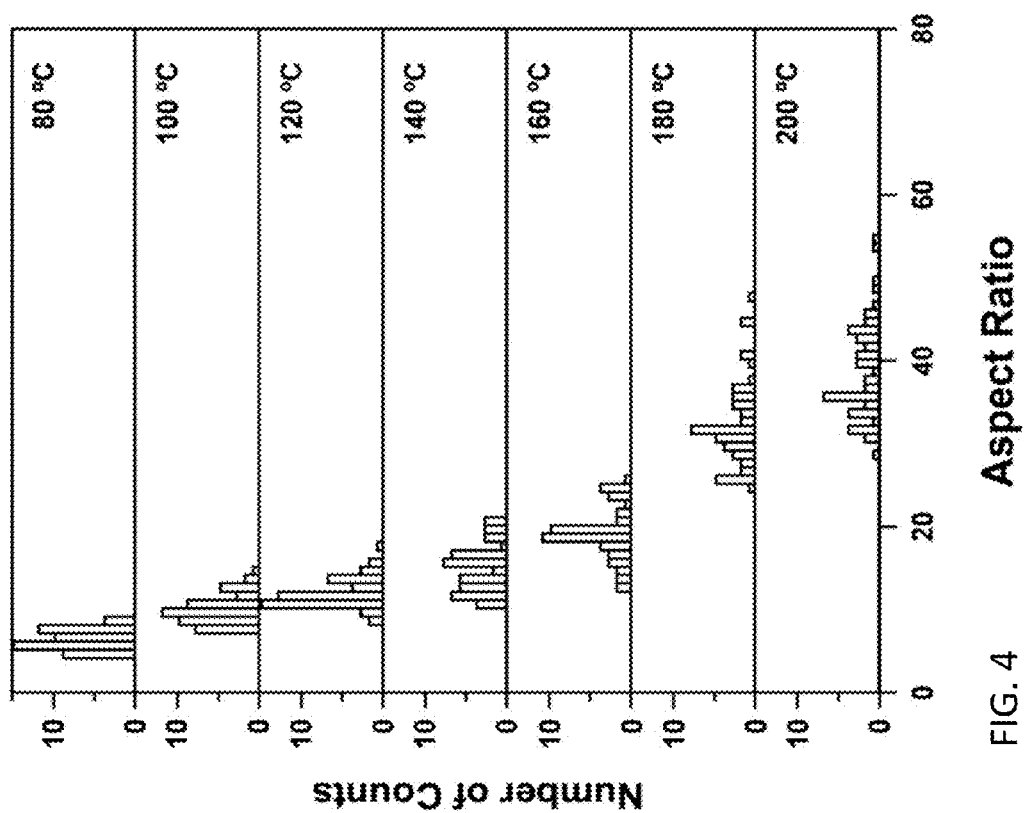
FIG. 4 shows histograms of calculated aspect ratios of microwave synthesized cerium oxide nanorods.

FIG. 4 shows histograms of calculated aspect ratios of microwave synthesized cerium oxide nanorods from their width and length measurements from their TEM images. The reaction temperatures for these nanorods were 80° C., 100° C., 120° C., 140° C., 160° C., 180° C. and 200° C. 50 data points were collected for nanorods synthesized at each reaction temperature.

Figure 5:
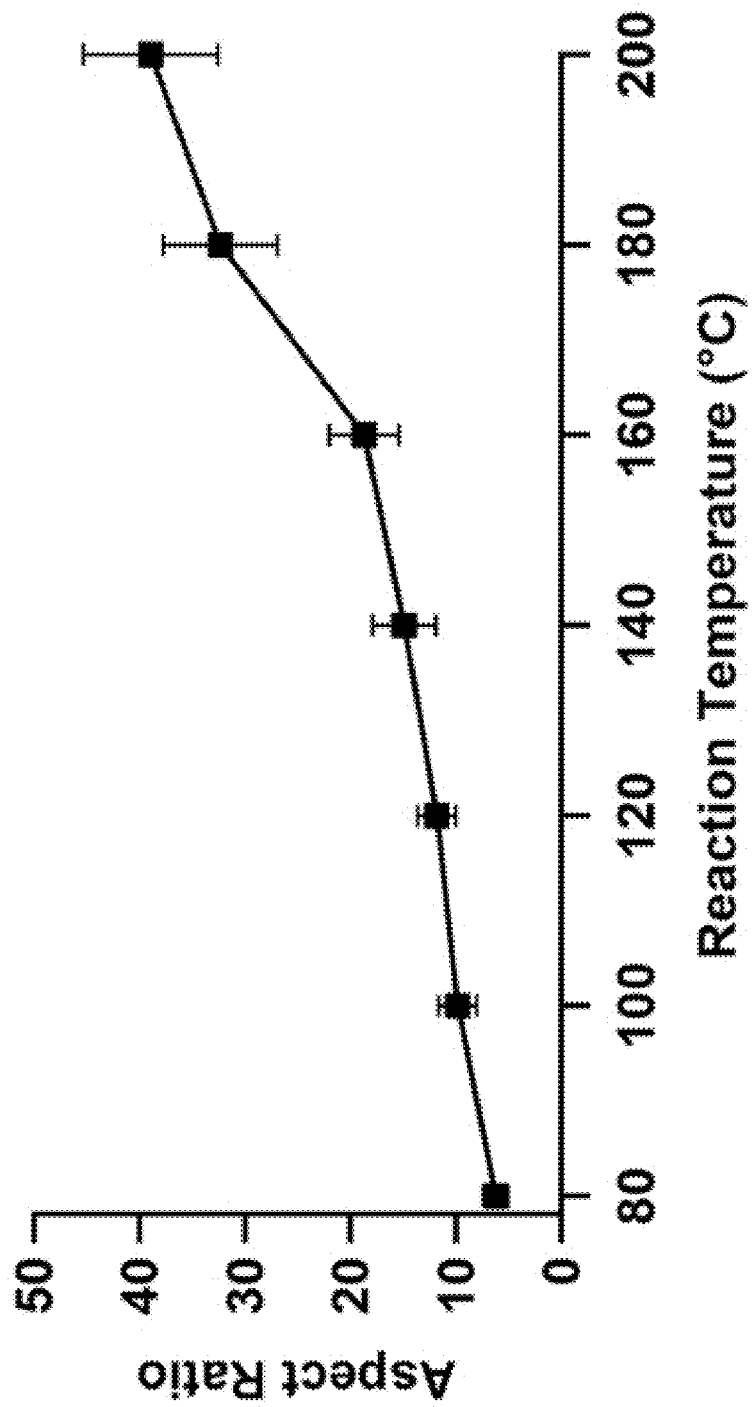
FIG. 5 shows a graph of the calculated aspect ratios of microwave synthesized cerium oxide nanorods versus their reaction temperatures.

FIG. 5 shows a graph of the calculated aspect ratios of microwave synthesized cerium oxide nanorods versus their reaction temperatures. 50 data points were collected for nanorods synthesized at each reaction temperature. These data points were calculated from the length and width measurements for each unbroken nanorod in the corresponding TEM images. Error bars indicate ±1 standard error.

At the lower reaction temperatures (e.g., 80° C., 100° C., and 120° C.), the nanorod morphology of the as-synthesized products was found to be uniform. As the reaction temperature was increased to, e.g., 140° C. and above, it appears from the TEM images that secondary crystallite nucleation occurred as most nanorod products were found increasingly decorated with cerium oxide nanoparticles (see FIG. 1 and FIGS. 2(a) to 2(h)).

Figure 6:
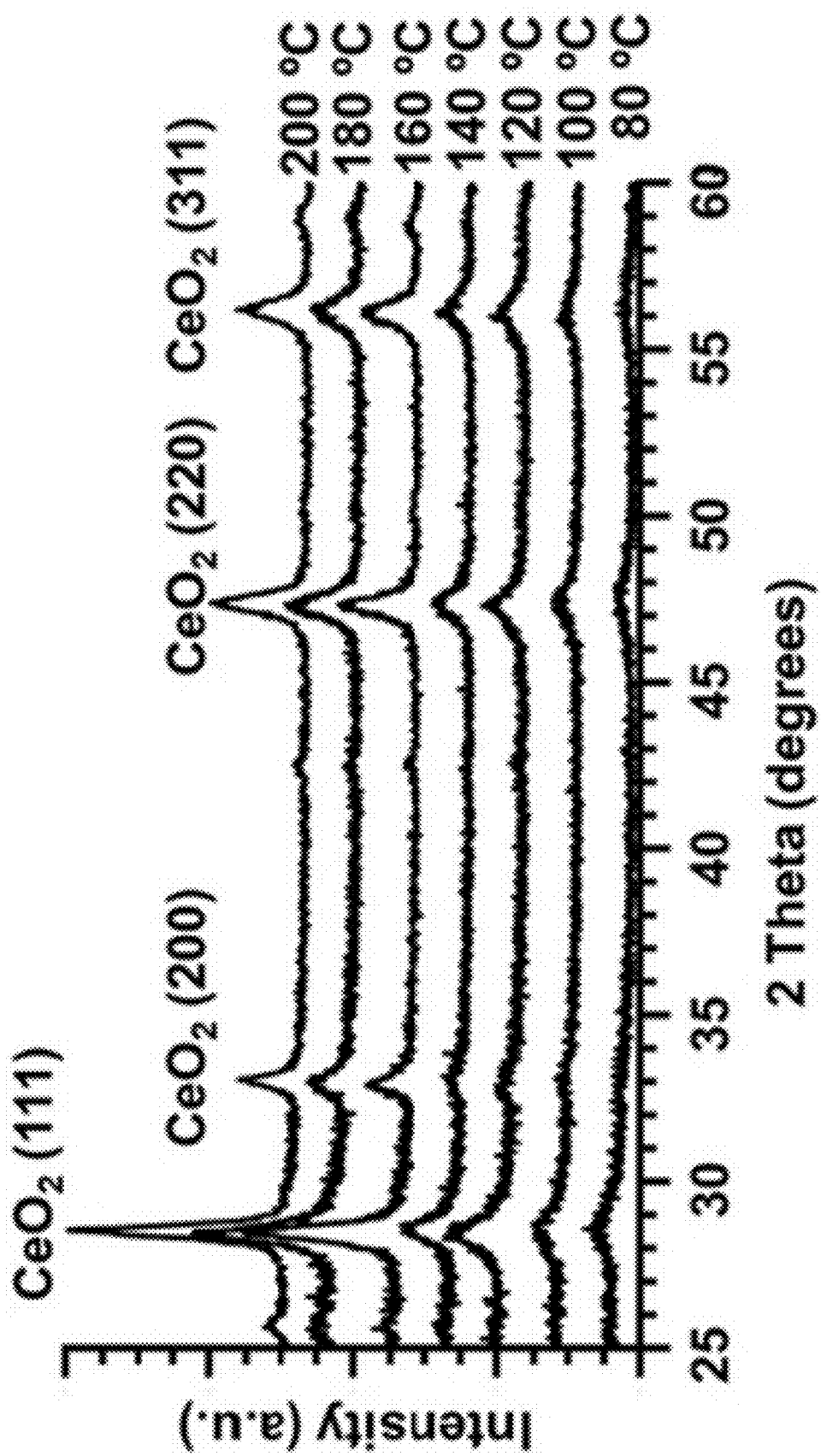
FIG. 6 is a graph showing X-ray diffractometry patterns of the as-synthesized nanorods.

FIG. 6 is a graph showing XRD patterns of the as-synthesized nanorods from a synthesis temperature of 80° C. to 200° C. The as-synthesized samples were demonstrated to be of the fluorite-like (Fm-3m) phase with no secondary phases observed in the XRD data. When the samples were analyzed using the same XRD experimental parameters, peak broadening was observed as the synthesis temperature was lowered from 200° C. to 80° C. The XRD patterns also demonstrated an elevated background at low two theta values (20°-40°) which flattened out as the temperature increased. These changes in the XRD data indicate the increase in crystallinity within the nanorods with increasing reaction temperature. This trend is also supported by the selected area electron diffraction data for the nanorods.

Figures 7A, 7B:
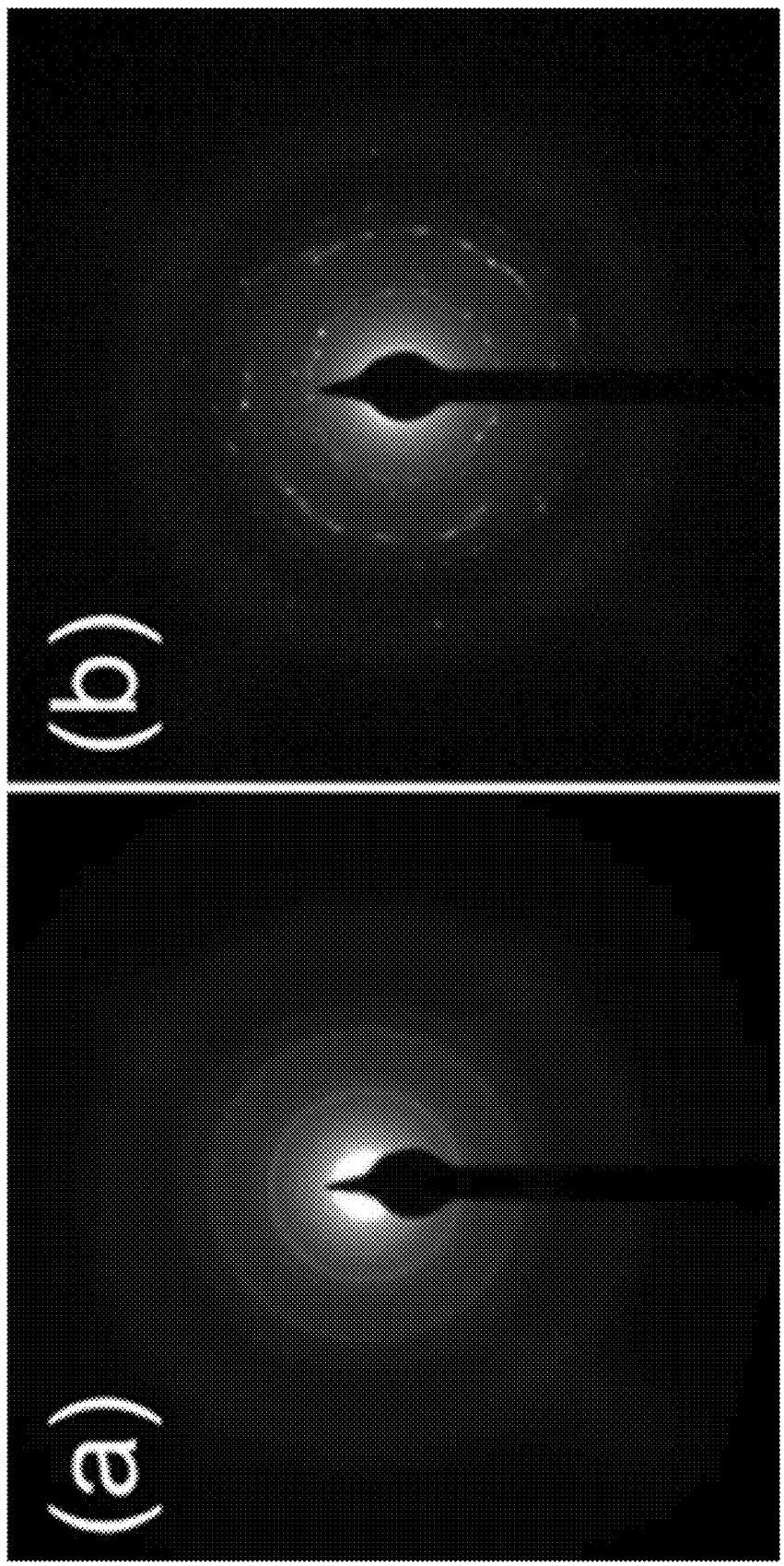
FIGS. 7(a) and 7(b) show select area electron diffraction patterns for cerium oxide nanorods samples.

FIGS. 7(a) and 7(b) show SAED patterns for the cerium oxide nanorods samples synthesized at (a) 80° C. and (b) 160° C. Referring to FIG. 7(a), the diffractogram for the sample formed at 80° C. displays diffuse ring patterns, suggesting that the samples have polycrystalline structure. Referring to FIG. 7(b), for the nanorod sample synthesized at the higher reaction temperature of 160° C., the corresponding diffractogram shows a mixture of rings and spots, confirming an increase in the crystallinity of nanorod products at higher reaction temperatures.

Figures 8A, 8B:
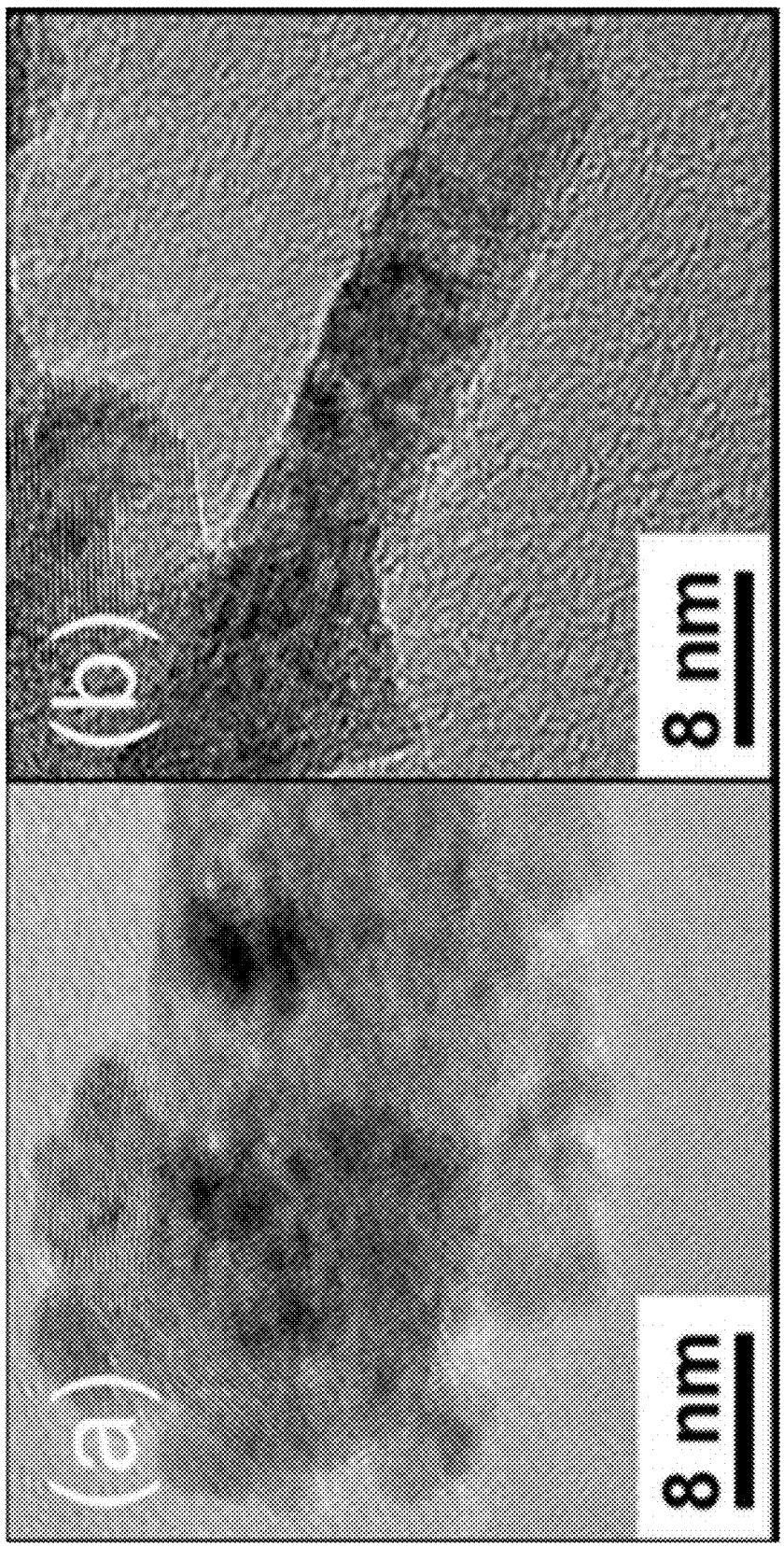
FIGS. 8(a) and 8(b) show high-resolution transmission electron microscopy images of cerium oxide nanorods.

The structure and formation of the nanorods at high reaction temperatures were further investigated using HRTEM. FIGS. 8(a) and 8(b) are HRTEM images of cerium oxide nanorods synthesized at (a) 180° C. and (b) 80° C.

Referring to FIG. 8(a), the tips of nanorods synthesized at high temperatures (namely 180° C. and 200° C.) were observed to be composed of clusters of cerium oxide crystallites, indicating significant secondary nucleation events occurred during the reactions. The sides of these rods were also found to have crystallites frequently attached to them. Referring to FIG. 8(b), the rods synthesized at temperatures lower than 140° C. exhibited faceted-and-pointed ends with no crystallite clusters decorating their tips. This finding, in conjunction with the XRD and SAED data, implies that at low reaction temperatures, the nanorods grew by the agglomeration of small adsorbed crystallites (ad-crystallites).

Without being bound by the theory presented herein, we hypothesize that at temperatures greater than 140° C., the small ad-crystallites were formed at a faster rate than they could be incorporated into the rod. The subsequent growth of unincorporated ad-crystallites into larger crystallites and clusters of ad-crystallites accounts for the observation of a mixture of particles and rods at temperatures greater than 140° C.

Figure 9:
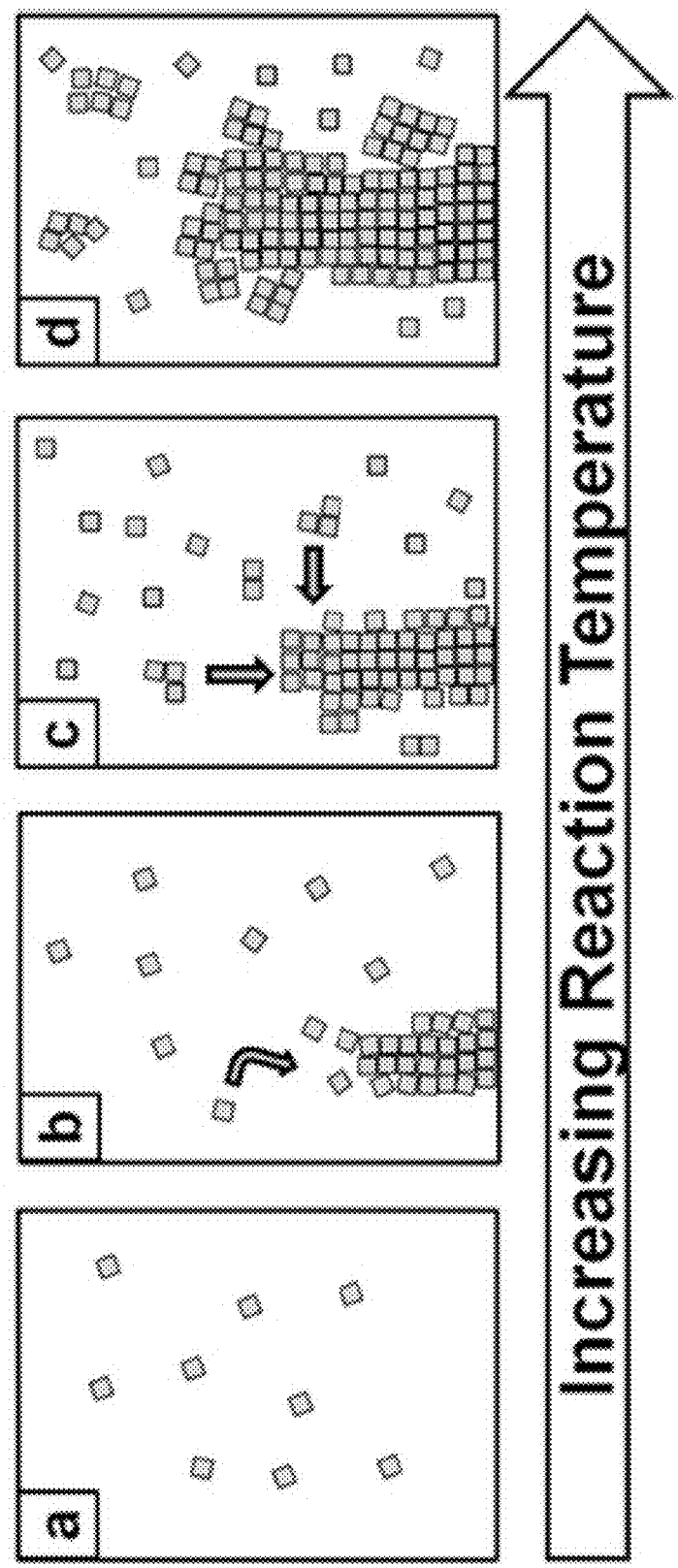
FIG. 9 is a diagram of a possible cerium oxide nanorod growth process at different reaction temperatures.

FIG. 9 is a diagram of a possible cerium oxide nanorod growth process at different reaction temperatures. (a) Nucleation of ad-crystallites (represented by squares for the simplicity of illustration) occurs once a critical temperature is reached. (b) Nanorod growth occurs through the "sticking" of the initial ad-crystallites together to form nanorods. (c) As the reaction temperature increases, the ad-crystallites begin forming clusters in the solution and the nanorods begin showing more surface decoration of crystallites. (d) At high reaction temperatures, large ad-crystallite clusters are formed at a rate faster than the rate of their incorporation into the rod. This results in the appearance of a mixture of large clusters and rods in the TEM images of the products.

The growth of nanorods at high temperatures appears to follow an oriented crystallite attachment mechanism, in which for $CeO_{2-x}$ nanorods further incorporation of the crystallites results in increased rod lengths. Such a growth motif may account for the changes in morphology and features in the high-temperature grown nanorods synthesized by the microwave hydrothermal method. It is also possible that the favored one-dimensional growth observed in the nanorod samples was enhanced by the use of NaOH which decreased the tendency of hydrogen bonding between crystallites. This may allow for further domination of the oriented attachment mechanism as a primary means of incorporating crystallites into the growing one-dimensional structures.

Table 1 shows that the surface areas of the $CeO_{2-x}$ nanorod samples generally decrease with increasing reaction temperature by the BET physisorption measurements. For example, the surface area of the nanorods synthesized at 80° C. was found to be about 117 $m^2/g$ whereas that of the sample synthesized at 200° C. was about 22 $m^2/g$. Since increasing the size and volume of nanomaterials generally results in decreased surface area, this trend is in agreement with the trend of size changes in the nanorods morphology data. One exception to this trend is the sample synthesized at the reaction temperature of 180° C., where the surface area of the sample increases slightly before dropping again at 200° C. This was likely caused by the "roughening" of the nanorod morphology due to small crystallites adhering to the nanorods at 180° C. At 200° C., these crystallites likely more rapidly incorporated into the nanorods than at 180° C., resulting in a continued trend of decreasing surface area.

In the above, we described a microwave hydrothermal method for the rapid synthesis of crystalline cerium oxide nanorods with tunable aspect ratios. The method provides control over properties of the cerium oxide nanorods including length, diameter, and surface area. The control was enabled by an adjustment of the reaction temperature for the hydrothermal condition as determined by the microwave heating. No changes to the concentration, changes to the identity of the chemical starting materials, or additives is needed to produce the range of changes in the observed nanorod's structural properties. This method decreases the potential for contamination that may affect the catalytic activity of cerium oxide samples.

A possible temperature dependent growth model was described in which the growth of uniform nanorods through the agglomeration of small ad-crystallites at reaction temperatures lower than 140° C. was observed. As the reaction temperature was increased above 140° C., the nanorods were observed to frequently exhibit the presence of nanoparticles, which were composed of ad-crystallites, attached to the rods' sides and tips. This was likely attributed to the faster nucleation rate of ad-crystallites in the solution than the rate for the incorporations of these crystallites into the nanorods. This resulted in their ripening into clusters of ad-crystallites observed in the TEM images of rods synthesized at high reaction temperature. The anisotropic growth of the cerium oxide materials through oriented attachment may have been enhanced by the choice of NaOH as the mineralizer agent and cerium sulfate as the precursors. Although the interactions between the growing cerium oxide materials and the reactants as a function of reaction temperature are complex, the experiment results show that the reaction temperature has a significant effect on the growth of cerium oxide nanorods where other variables are fixed.

Figure 10:
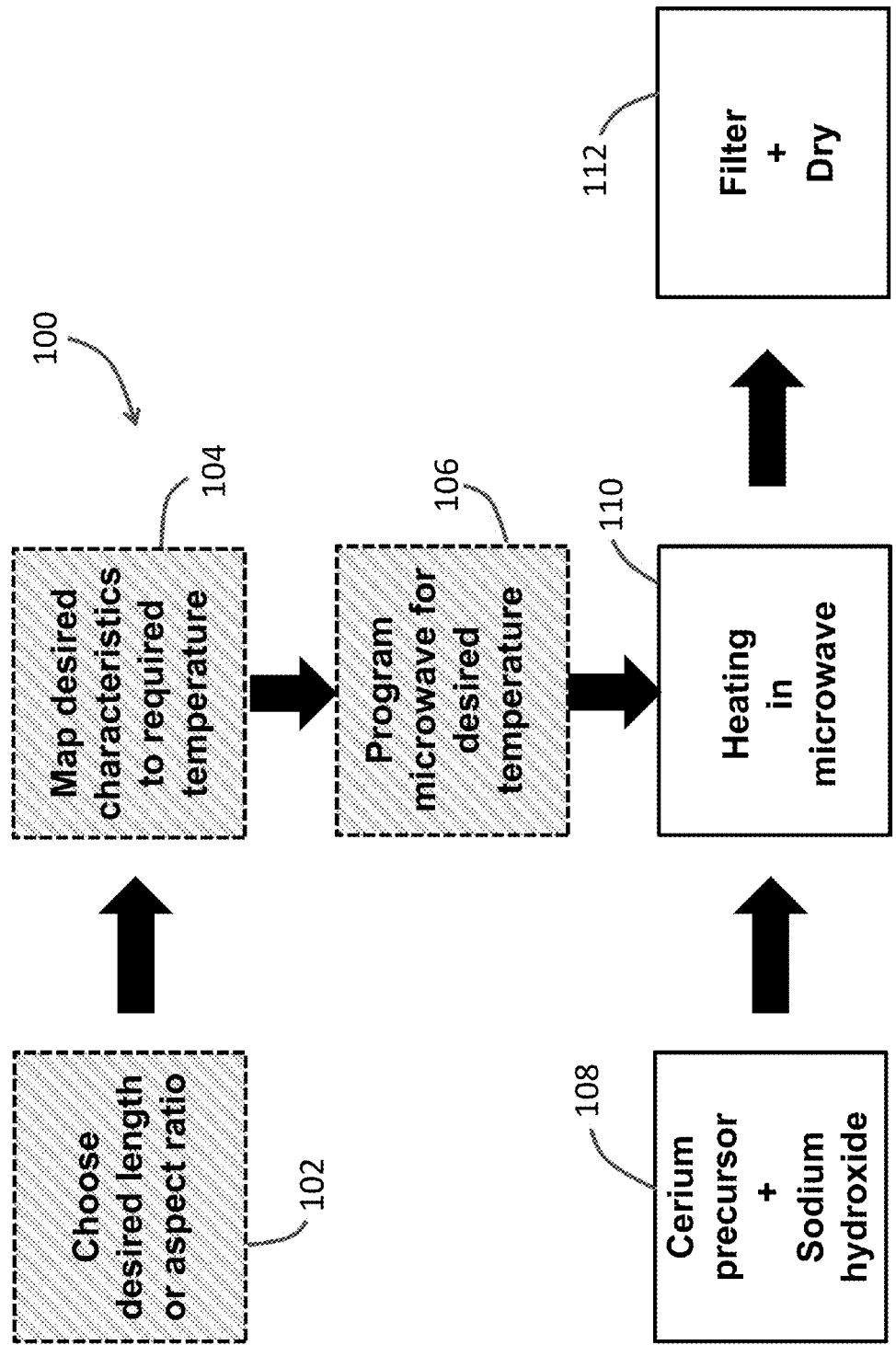
FIG. 10 shows a flow diagram of a process for producing cerium oxide nanorods having a specified length or aspect ratio.

FIG. 10 shows a flow diagram of a process 100 for producing cerium oxide nanorods having a specified length or aspect ratio. A user chooses a desired length or aspect ratio (102) for the cerium oxide nanorods. Based on previously stored information that maps aspect ratios and/or lengths to temperatures, the desired characteristic is mapped to the corresponding temperature (104). A microwave heating system is programmed for the desired temperature (106). A cerium precursor material is mixed with sodium hydroxide (108). The mixture is heated in the microwave heating system (110). The synthesized products are cooled, filtered, and dried (112).

In some implementations, a system for fabricating cerium oxide nanorods may include a first container that contains a cerium precursor material, and a second container that contains sodium hydroxide. A valve of the first container and a valve of the second container may be controlled by a controller to be opened to enable the cerium oxide precursor material and the sodium hydroxide to flow to a third container. Under the control of the controller, perhaps with the assistance of a robot, a robotic arm, or other machine-controlled mechanism, the third container is sealed and placed in a microwave heating oven.

The system includes an input device (which may include, e.g., a display, a keyboard, and a pointing device such as a computer mouse) for allowing a user to specify a desired characteristic of the cerium oxide nanorod, such as the aspect ratio or length. The system includes a storage device (e.g., hard drive, solid state memory, or dynamic random access memory) storing a table having information that maps aspect ratios and/or lengths to temperatures. The table may also have information about the duration of heating time. The mapping information is established based on past experiments or trials. After the desired length or aspect ratio is received from the user, the controller looks up the table and determines the heating temperature that corresponds to the desired length or aspect ratio. The controller configures the microwave heating oven to heat the third container that contains the mixture of the cerium oxide precursor material and the sodium hydroxide to the specified temperature for the specified period of time.

The robot or robotic arm, which may be under the control of the controller, retrieves the third container from the microwave heating system, allows the third container to cool to room temperature, removes the synthesized products from the third container, passes the synthesized products through a filter, rinses the filtered products, and places the rinsed products in a dryer. The dried products include synthesized cerium oxide nanorods that have the desired length or aspect ratio specified by the user.

The controller may include a programmable system having at least one programmable processor coupled to receive data and instructions from, and to transmit data and instructions to, a data storage system for storing data and instructions. The at least one programmable processor can include, e.g., general purpose microprocessors, special purpose microprocessors, or digital signal processors.

Although some examples have been discussed above, other implementations and applications are also within the scope of the following claims. For example, the cerium precursor material can be different from those described above. The microwave heating temperature can be different from those described above. The microwave heating oven can be different from those described above. The microwave frequency can be, e.g., 2.45 GHz, or other microwave frequencies. The lengths and aspect ratios of the cerium oxide nanorods can be different from those described above. The system for fabricating cerium oxide nanorods may have additional components not described above. The cerium oxide nanorods synthesized using different reaction temperatures may have different colors. This indicates a difference in the amount of oxygen vacancy defects present on the material surface. The amount of the defects plays a strong role in the catalytic activity of cerium oxide materials. The distinct difference in colors of the cerium oxide nanorods may be useful in applications such as colorimetric chemical sensors. Table 1 above shows a mapping between aspect ratio and reaction temperature, and a mapping between length and reaction temperature. It is also possible to measure the diameters of the nanorods synthesized under various reaction temperatures and produce a mapping between diameter and reaction temperature. This allows a user to synthesize cerium oxide nanorods having a specified diameter by setting the microwave heating system to a corresponding temperature. The microwave-assisted hydrothermal method can be used to produce other types of cerium oxide nanomaterials having other shapes, and is not limited to producing nanorods. Varying the microwave heating temperature can vary the aspect ratios and/or dimensions of the nanomaterials.

As shown in FIG. 4, when the reaction temperature is set to a specific temperature, the cerium oxide nanorods produced using the microwave assisted hydrothermal method may have a range or distribution of aspect ratios. When the reaction temperature changes, the range or distribution of aspect ratios also changes. In this document, when we say synthesizing cerium oxide nanorods having a specified aspect ratio, length, or diameter, we do not mean that the cerium oxide nanorods produced using this process all have exactly the same specified aspect ratio, length, or diameter. Rather, we mean that depending on context, the average value of the aspect ratio, length, or diameter is equal to the specified value, or the center value of the distribution of values is equal to the specified value, or that a portion of the cerium oxide nanorods produced using this process have the specified value for aspect ratio, length, or diameter.

What is claimed is:

1. A method of fabricating cerium oxide nanorods, the method comprising:
   receiving input specifying an aspect ratio that is greater than 20 or a length that is greater than 200 nm;
   accessing information that maps aspect ratios and lengths to temperatures, the information including mapping aspect ratios greater than 20 to temperatures, and mapping lengths greater than 200 nm to temperatures, and based on the information, mapping the input aspect ratio or length to a specified temperature; and
   using microwave to heat a mixture that includes a cerium precursor material to the specified temperature and produce a plurality of cerium oxide nanorods having aspect ratios or lengths that correspond to the input aspect ratio or length.

2. The method of claim 1, comprising mixing a cerium sulfate precursor and sodium hydroxide to produce the mixture that includes the cerium precursor material.

3. The method of claim 1 in which producing the plurality of cerium oxide nanorods comprises producing fluorite structured cerium oxide nanorods.

4. The method of claim 1 in which heating the mixture to the specified temperature comprises heating the mixture to a temperature in a range from 80° C. to 200° C.

5. The method of claim 1 in which producing the plurality of cerium oxide nanorods comprising producing a plurality of cerium oxide nanorods having a range of aspect ratios from 20:1 to 60:1.

6. The method of claim 1 in which the information includes information about a first aspect ratio that maps to a first temperature, and a second aspect ratio that maps to a second temperature, and the first aspect ratio is greater than the second aspect ratio by at least 50%.

7. The method of claim 1 in which the information includes information about a first aspect ratio that maps to a first temperature, and a second aspect ratio that maps to a second temperature, and the first aspect ratio is greater than at least twice the second aspect ratio.

8. The method of claim 1 in which the information includes information about a first aspect ratio that maps to a first temperature, and a second aspect ratio that maps to a second temperature, and the first aspect ratio is greater than at least three times the second aspect ratio.

9. The method of claim 1 in which the information includes information about a first length that maps to a first temperature, and a second length that maps to a second temperature, and the first length is greater than the second length by at least 50%.

10. The method of claim 1 in which the information includes information about a first length that maps to a first temperature, and a second length that maps to a second temperature, and the first length is greater than at least twice the second length.

11. The method of claim 1 in which the information includes information about a first length that maps to a first temperature, and a second length that maps to a second temperature, and the first length is greater than at least three times the second length.

12. The method of claim 1, comprising after heating the mixture, cooling the mixture, filtering the mixture, and drying the mixture to produce the plurality of cerium oxide nanorods.

13. The method of claim 1 in which the aspect ratio is greater than 25.

14. The method of claim 1 in which the aspect ratio is greater than 30.

15. The method of claim 1 in which the aspect ratio is greater than 35.

16. The method of claim 1 in which the length is greater than 300 nm.

17. The method of claim 1 in which the length is greater than 400 nm.

18. The method of claim 1 in which the length is greater than 500 nm.

19. The method of claim 1 in which the length is greater than 600 nm.

20. The method of claim 1 in which the length is greater than 700 nm.

21. The method of claim 1 in which the length is greater than 800 nm.

22. The method of claim 1 in which the length is greater than 900 nm.

23. The method of claim 1 in which the length is greater than 1000 nm.

24. The method of claim 1 in which the length is greater than 1100 nm.

25. The method of claim 1 in which the length is greater than 1200 nm.

26. The method of claim 1 in which the length is greater than 1300 nm.

27. The method of claim 1 in which the length is greater than 1400 nm.

28. The method of claim 1 in which the length is greater than 1500 nm.

29. The method of claim 1 in which the length is greater than 1600 nm.

30. The method of claim 1 in which the length is greater than 1700 nm.

31. The method of claim 1 in which the length is greater than 1800 nm.

32. The method of claim 1 in which the length is greater than 1900 nm.

33. The method of claim 1 in which the length is greater than 2000 nm.

34. The method of claim 1, comprising:
    receiving a second input specifying a second aspect ratio or a second length;
    accessing information that maps aspect ratios and lengths to temperatures, and based on the information, mapping the second input aspect ratio or second length to a second specified temperature;
    using microwave to heat a second mixture that includes a cerium precursor material to the second specified temperature and produce a second plurality of cerium oxide nanorods having second aspect ratios or second lengths that correspond to the second input aspect ratio or length; and
    compressing the plurality of cerium oxide nanorods and the second plurality of cerium oxide nanorods into a compressed format such that the cerium oxide nanorods in the compressed format have at least one of various lengths or various aspect ratios.

35. The method of claim 1 in which accessing information that maps aspect ratios and lengths to temperatures comprises using a controller to access a storage device that has information including mapping aspect ratios greater than 20 to temperatures, and mapping lengths greater than 200 nm to temperatures.

36. The method of claim 35 in which mapping the input aspect ratio or length to a specified temperature comprises using the controller to look up the table and map the input aspect ratio or length to a specified temperature.

37. The method of claim 36 in which using microwave to heat a mixture comprises using the controller to configure a microwave heater to heat the mixture of the cerium precursor material to the specified temperature.

38. A method of fabricating cerium oxide nanorods, the method comprising:
receiving input specifying an aspect ratio or a length;
accessing information that maps aspect ratios and lengths to temperatures that are achieved by microwave heating, the information indicating that the length and aspect ratio increase as the temperature increases, and based on the information, mapping the input aspect ratio or length to a specified temperature; and
using microwave to heat a mixture that includes a cerium precursor material to the specified temperature and produce a plurality of cerium oxide nanorods having aspect ratios or lengths that correspond to the input aspect ratio or length.

39. The method of claim 38 in which the information includes mapping aspect ratios greater than 20 to temperatures, and mapping lengths greater than 200 nm to temperatures.

40. The method of claim 38 in which the length is greater than 1000 nm.

41. The method of claim 38 in which the aspect ratio is greater than 30.

42. The method of claim 38, comprising mixing a cerium sulfate precursor and sodium hydroxide to produce the mixture that includes the cerium precursor material.

43. The method of claim 38 in which producing the plurality of cerium oxide nanorods comprises producing fluorite structured cerium oxide nanorods.

* * * * *